United States Patent
Kamijima (10) Patent No.: US 6,483,664 B2
(45) Date of Patent: Nov. 19, 2002

(54) THIN FILM MAGNETIC HEAD AND METHOD OF MANUFACTURING SAME

(75) Inventor: Akifumi Kamijima, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/409,430

(22) Filed: Sep. 30, 1999

(65) Prior Publication Data

US 2002/0060878 A1 May 23, 2002

(30) Foreign Application Priority Data

Oct. 7, 1998 (JP) ............................ 10-285770

(51) Int. Cl.[7] .................. G11B 5/147; G11B 5/127; G11B 5/33; G11B 5/21
(52) U.S. Cl. ....................... 360/126; 360/317
(58) Field of Search ................. 360/126, 125, 360/119, 317, 123

(56) References Cited

U.S. PATENT DOCUMENTS

| | | | | |
|---|---|---|---|---|
| 5,805,391 A | * | 9/1998 | Chang et al. | 360/317 |
| 5,828,533 A | * | 10/1998 | Ohashi et al. | 360/126 |
| 5,872,693 A | * | 2/1999 | Yoda et al. | 360/126 |
| 6,130,805 A | * | 10/2000 | Sasaki et al. | 360/126 |
| 6,163,436 A | * | 12/2000 | Sasaki et al. | 360/126 |
| 6,172,848 B1 | * | 1/2001 | Santini | 360/126 |
| 6,191,916 B1 | * | 2/2001 | Sasaki | 360/123 |
| 6,204,997 B1 | * | 3/2001 | Sasaki | 360/123 |
| 2002/0080522 A1 | * | 6/2002 | Sato et al. | 360/126 |

FOREIGN PATENT DOCUMENTS

JP  A-7-262519  10/1995

* cited by examiner

Primary Examiner—Hoa T. Nguyen
Assistant Examiner—Julie Anne Watko
(74) Attorney, Agent, or Firm—Oliff & Berridge PLC (57) ABSTRACT

A thin film magnetic head with a sufficient over write characteristic and a small magnetic pole width. A sub-pole tip is formed to cover the edge opposite to the air-bearing surface of a pole tip. The part where the sub-pole tip and the pole tip are overlapped is used as a sub-magnetic pole portion. The volume of the sub-magnetic pole portion is larger than that of a magnetic pole portion which consists of only the pole tip. Thereby, the saturation of the flux in a region in vicinity of the position of throat height 0 is suppressed and thus a sufficient over write characteristic is achieved.

19 Claims, 11 Drawing Sheets

--Prior Art--

--Prior Art--

THIN FILM MAGNETIC HEAD AND METHOD OF MANUFACTURING SAME

BACKGROUND OF THE INVENTION

1. Field of the Invention

The present invention relates to a thin film magnetic head having at least an inductive-type magnetic transducer for writing and a method of manufacturing the same.

2. Description of the Related Art

In recent years, performance improvement in thin film magnetic heads has been sought in accordance with an increase in surface recording density of a hard disk drive. A composite thin film magnetic head, which has a layered structure including a recording head having an inductive-type magnetic transducer for writing and a reproducing head having magneto resistive (MR) elements for reading, has been widely used as a thin film magnetic head.

The performance of the reproducing head can be improved in several ways. One way is to form an MR film from a material which has good magnetic resistive sensitivity such as a GMR film instead of an AMR film; another is to adjust a pattern width of the MR film, especially an MR height. The MR height is the length (height) between one end of the MR element closer to an air-bearing surface and the other end thereof. The MR height is originally determined by an amount of grinding when the air-bearing surface is processed. The air-bearing surface as used herein refers to a surface of a thin film magnetic head that faces a magnetic recording medium and is also called a track surface.

Performance improvement in a recording head has also been expected in accordance with the performance improvement in a reproducing head. A factor determining the performance of a recording head is the throat height (TH). The throat height is the length (height) of a portion (magnetic pole portion) spreading from the air-bearing surface to an edge of an insulating layer for electrically isolating a thin film coil for causing magnetic flux. Reducing the throat height is desirable in order to improve the performance of a recording head. The throat height is determined as well by an amount of grinding when the air-bearing surface is processed.

It is required to increase the track density of a magnetic recording medium in order to increase the recording density among the performance of a recording head. This requires a recording head having a narrow track structure in which the width of a bottom pole and a top pole sandwiching a write gap layer on the air-bearing surface is reduced to the order of some microns to submicron. Semiconductor process technique is used to achieve this narrow track structure.

Figure 21A:
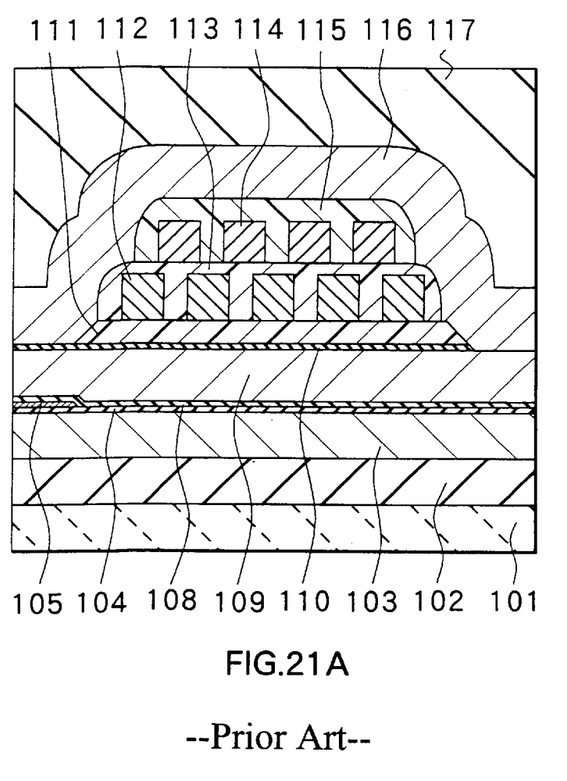
FIGS. 21A and 21B are cross-sectional views for describing a structure of a thin film magnetic head of the related art.
Figure 21B:
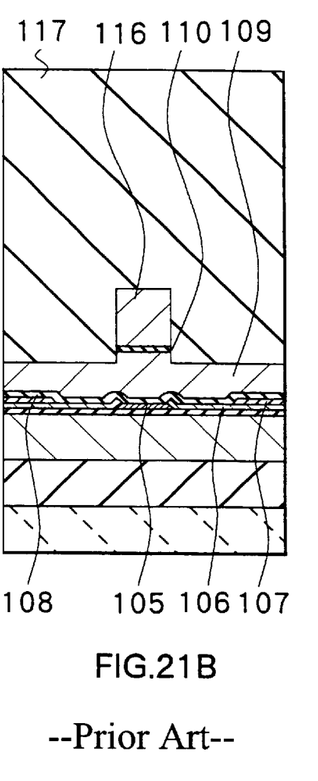

FIGS. 21A and 21B show a structure of a composite thin film magnetic head as an example of a thin film magnetic head of a related art. FIG. 21A shows a cross section perpendicular to the air-bearing surface. FIG. 21B shows a cross section parallel to the air-bearing surface of the magnetic pole portion.

The composite thin film magnetic head has an insulating layer 102 made of, for example, alumina (aluminum oxide, $Al_2O_3$) of about 5 to 10 μm in thickness formed on a substrate 101 made of, for example, aluminum oxide and titanium carbide ($Al_2O_3$.TiC). Further, a bottom shield layer 103 for a reproducing head is formed from a magnetic material on the insulating layer 102. Alumina or aluminum nitride, for example, is sputtered on the bottom shield layer 103 to form a bottom shield gap film 104 as an insulating layer. An MR element 105 for reproduction is formed on the bottom shield gap film 104. Furthermore, a pair of first electrode layer 106 which is electrically connected to the MR element 105 is formed on the bottom shield gap film 104. The first electrode layer 106 is formed by stacking TiW, CoPt, TiW, and Ta, for example.

Also, a pair of second electrode layer 107 is electrically connected to the first electrode layer 106. The second electrode layer 107 can be formed from copper (Cu), for example. The first electrode layer 106 and the second electrode layer 107 constitute a lead, which is electrically connected to the MR element 105.

As an insulating layer, an upper shield gap layer 108 is formed on the bottom shield gap layer 104 and the MR element 105. The MR element 105 is buried in the shield gap layers 104 and 108. A top shield-cum-bottom pole layer (called bottom pole layer in the following) 109, made of a magnetic material and used both for a reproducing head and for a recording head is formed on the upper shield gap layer 108. A write gap layer 110 made of an insulating film such as an alumina film is formed on the bottom pole layer 109. A photoresist layer 111 which determines throat height is formed on the write gap layer 110 in a predetermined pattern. A first layer of a thin film coil 112 for an inductive-type head for recording is formed on the photoresist layer 111. Further, a photoresist layer 113 is formed in a predetermined pattern on the photoresist layer 111 and the thin film coil 112. A heat treatment of the temperature of 200–250° C., for example, is applied for stabilizing the photoresist layer 113. A second layer of a thin film coil 114 is formed on the photoresist layer 113. A photoresist layer 115, which is stabilized by heat treatment, is formed in a predetermined pattern on the photoresist layer 113 and the thin film coil 114.

The write gap layer 110 is etched partially to form a yoke in the rear (right-hand side in FIG. 21A) of the thin film coils 112 and 114. A top pole layer 116 made of a magnetic material for the recording head, that is, a high saturation flux density material such as permalloy (NiFe) or nitride ferrous (FeN) is formed on the write gap layer 110, the photoresist layers 111, 113, and 115. The top pole layer 116 has a contact with, and is magnetically coupled to the bottom pole layer 109 in the rear of the thin film coils 112 and 114. An over coat layer 117 made of alumina, for example, is formed on the top pole layer 116. Each of the side walls of a part of the top pole layer 116, the write gap layer 110 and the bottom pole layer 109 is formed vertically and in a self-aligned manner to form a trim structure. This trim structure can prevent widening of effective write track width caused by widening of magnetic flux in writing data in the narrow track.

Figure 22:
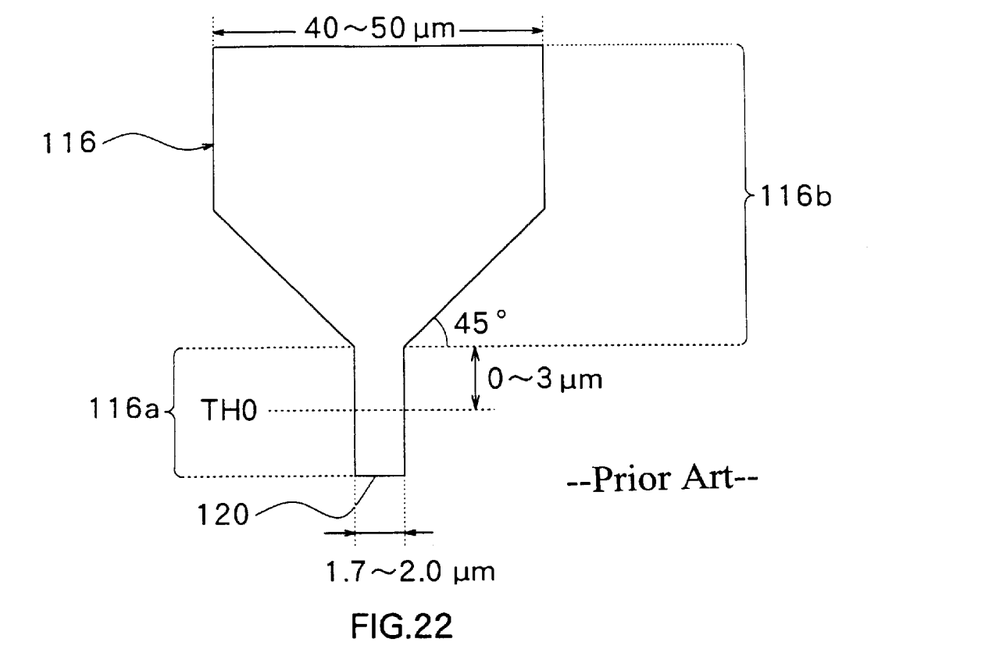
FIG. 22 is a plan view showing an example of a shape of a top pole layer in a thin film magnetic head of the related art.

FIG. 22 shows an example of a shape of the top pole layer 116. The top pole layer 116 has a magnetic pole portion 116a which is placed closer to the air-bearing surface 120 and a yoke area 116b which is placed at the position facing the thin film coils 112 and 114. A part of the yoke area 116b at the side of the magnetic pole portion 116a is tapered off as it is close to the magnetic pole portion 116a. The outer edge of the tapered part is inclined to 45°, for example, against the surface which is parallel to the air-bearing surface 120. The TH0, Throat Height position 0, in figures indicates a position of the edge of the insulating layer closer to the air bearing surface, which separates thin film coil electrically.

Figure 23:
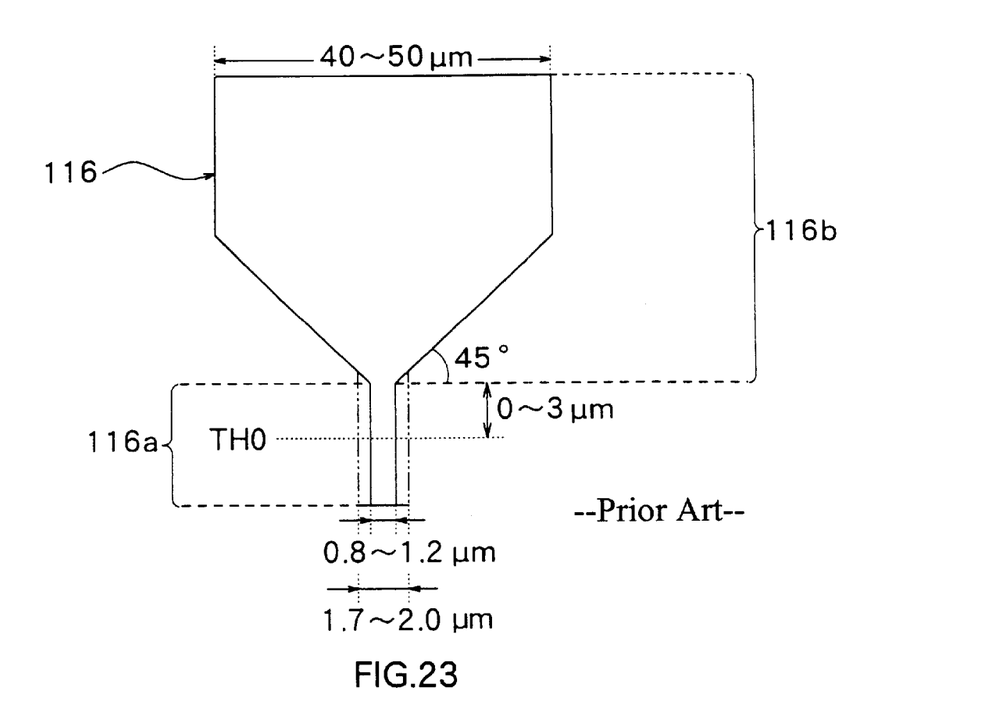
FIG. 23 is a plan view showing an example of a shape of a top pole layer in a thin film magnetic head when a pole width is reduced.

These days, reducing the write track width, or the width of the magnetic pole portion (called pole width in the followings), is required for high surface density writing. FIG. 23 shows an example of a shape of the top pole layer 116 with narrower pole width than that of FIG. 22. In this example, the width of the magnetic pole portion 116a is 0.8–1.2 μm. It is possible that the width of the magnetic pole portion 116a will be around 0.4 μm of the submicron order in future.

Conventionally, if the top pole layer 116 is formed like that in FIG. 22, the magnetic flux caused from the thin film coils 112 and 114 does not saturate on the way but reaches to the top of the magnetic pole portion.

However, as shown in FIG. 23, for example, when the pole width is reduced, the flux saturates in vicinity of the Throat Height 0 position, TH0, and the flux does not reach to the top of the magnetic pole portion. As a result, an over write characteristic, that is, a characteristic in over-writing data on a recording media on which something is written already, indicates values as low as around 10–20 dB, for example, and the sufficient over write characteristic can not be obtained.

Meanwhile, the top pole layer is formed by the frame plating method, for example, described in Japanese Patent Application laid-down in Hei 7-262519. In order to form the top pole layer by the frame plating method, first, a thin electrode film made of permalloy, for example, is formed by sputtering, for example, all over the apex area which is a coil portion formed into a shape like a mountain. Next, photoresist is applied thereon and patterned through photolithography. A frame for plating is thus formed. Further, the top pole layer is formed through the plating method, using the electrode film formed earlier as a seed layer.

However, the apex area and other areas have, for example, equal to or more than 7 to 10 μm differences in heights. The photoresist of 3–4 μm in thickness is applied on the apex area. If the film thickness of the photoresist on the apex area is required to be equal to or more than 3 μm, a photoresist film of equal to or more than 8 to 10 μm, for example, in thickness is formed in the lower part of the apex area since the photoresist gathers into a lower area because of liquidity.

To form a narrow magnetic pole portion, a frame pattern with width of around 1.0 μm each must be formed with a photoresist film. In other words, a micro pattern with width of 1.0 μm or less must be formed with a photoresist film of 8–10 μm or more in thickness. However, it has been extremely difficult to form such a thick photoresist pattern with a small width in manufacturing.

Further, during an exposure of photolithography, a light for the exposure is reflected by a bottom electrode film as a seed layer, and the photoresist is exposed also by the reflection light causing deformation of the photoresist pattern so that a sharp and accurate photoresist pattern can not be obtained. As a result, the top pole layer can not be formed in a desired shape; the side walls of the top pole layer take a shape of being rounded, for example. This is the case in particular when the top pole layer 116 is formed in the shape of that shown in FIG. 23. The reflection lights reflected by the bottom electrode film impinge in the vicinity of the border of the magnetic pole portion 116a and the yoke area 116b. These reflection lights include not only the light in the vertical direction but also the light reflected from the slope of the apex area in the diagonal or horizontal direction. The reflection lights affect on the exposure of the photoresist layer, and it easily allows a wider photoresist pattern than that with the desired value, which determines pole width.

SUMMARY OF THE INVENTION

The invention is presented to solve these problems. The first object is to provide a thin film magnetic head, which can obtain a sufficient over write characteristic even if pole width is reduced, and a method of manufacturing the same.

In addition to the first objective, the second object is to provide a thin film magnetic head, which can precisely control the pole width even if pole width is reduced, and a method of manufacturing the same.

A thin film magnetic head of the invention comprises an inductive-type magnetic transducer for writing which has two magnetic layers and a thin film coil provided between the magnetic layers with an insulating layer in between, the magnetic layers including two magnetic pole portions which are magnetically coupled to and face each other in part of the sides facing a recording medium with a write gap layer in between and comprise at least one layer for each magnetic layer, wherein at least one of the two magnetic layers comprising: a magnetic pole portion, one edge of which is placed closer to the surface facing the medium which face a recording medium; a submagnetic pole portion, one edge of which is magnetically coupled to the other edge of the magnetic pole portion, having a greater film thickness than that of the magnetic pole portion; and a yoke area being magnetically coupled to another edge of the sub-magnetic pole portion.

According to the invention, a manufacturing method of a thin film magnetic head comprising an inductive-type magnetic transducer for writing which has two magnetic layers and a thin film coil provided between the magnetic layers with an insulating layer in between, the magnetic layers including two magnetic pole portions which are magnetically coupled to and face each other in part of the sides facing a recording medium with a write gap layer in between and comprise at least one layer for each magnetic layer, comprises steps of: forming a magnetic pole portion so that one edge of the magnetic pole portion is placed closer to the surface facing the medium which faces the recording medium; forming an sub-magnetic pole portion, one edge of which is magnetically coupled to the other edge of the magnetic pole portion, having a greater film thickness than that of the magnetic pole portion; and forming a yoke area being magnetically coupled to another edge side of the sub-magnetic pole portion.

In the thin film magnetic head and the method of manufacturing the same of the invention, a sub-magnetic pole portion having a greater film thickness than that of the magnetic pole portion is magnetically coupled to the other edge of the magnetic pole portion. Therefore, it is possible to obtain a large volume of pole in vicinity of the throat height 0 position even if the width of the magnetic pole portion, or the pole width is reduced. Also, it is possible to suppress flux saturation in vicinity of the throat height 0 position and to obtain submicron order of pole width.

Further, in the thin film magnetic head and the manufacturing the same of the invention, the sub-magnetic pole portion may be wider than the magnetic pole portion.

Further, in the thin film magnetic head and the manufacturing the same of the invention, the magnetic pole portion may be formed to be vertical to the surface facing the medium and to the edge surface closer to the surface facing the medium of the sub-magnetic pole portion.

Further, in the thin film magnetic head and the manufacturing the same of the invention, at least the film thickness of the sub-magnetic pole portion may be formed to be reduced gradually as it is closer to the surface facing the medium.

Further, in the thin film magnetic head and the manufacturing the same of the invention, after the magnetic pole portion is formed as a magnetic layer with a rectangular section, the sub-magnetic pole portion may be formed by covering a part opposite to the surface facing the medium of the magnetic layer with at least one layer of other magnetic layers.

Further, in the thin film magnetic head and the manufacturing the same of the invention, after the gap layer is formed, an insulating layer for determining a throat height may be formed between the gap layer and the sub-magnetic pole portion of one of the magnetic layers.

Further, in the thin film magnetic head and the manufacturing the same of the invention, the edge closer to the surface facing the medium of the sub-magnetic pole portion may be placed in vicinity of the edge closer to the surface facing the medium of the insulating layer.

Further, in the thin film magnetic head and the manufacturing the same of the invention, it is preferable that the yoke area be formed wider than the sub-magnetic pole portion.

Further, in the thin film magnetic head and the manufacturing the same of the invention, at least one layer of thin film coil may be formed in a region spreading over the surface opposite to the surface facing the medium of the sub-magnetic pole portion and the surface of the gap layer.

Other and further objects, features and advantages of the invention will appear more fully from the following description.

DETAILED DESCRIPTION OF THE PREFERRED EMBODIMENTS

Embodiments of the invention will be described with reference to the drawings in the followings.

First Embodiment

First, the manufacturing method of a composite thin film magnetic head will be described as the manufacturing method of a thin film magnetic head according to a first embodiment of the invention with reference to FIGS. 1A and 1B to 12A and 12B. FIGS. 1A, 2A, 3A, 4A, 5A, 6A, 7A, 8A, 9A, 10A, 11A and 12A show cross sections vertical to the air-bearing surface. FIGS. 1B, 2B, 3B, 4B, 5B, 6B, 7B, 8B, 9B, 10B, 11B and 12B show cross sections parallel to the air-bearing surface of the magnetic pole portion.

Figure 1A:
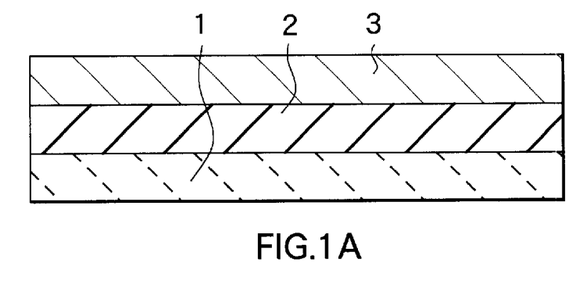
FIGS. 1A and 1B are cross-sectional views for describing one step of a manufacturing procedure of a thin film magnetic head according to a first embodiment of the invention.
Figure 1B:
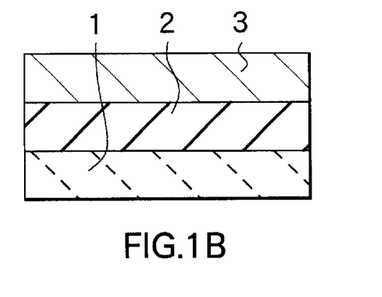

In the manufacturing method according to this embodiment, as shown in FIGS. 1A and 1B, an insulating layer 2 of about 5 $\mu$m in thickness made of alumina ($Al_2O_3$), for example, is deposited on a substrate 1 made of aluminum oxide and titanium carbide ($Al_2O_3$.TiC), for example. Then, a bottom shield layer 3 of 2–3 $\mu$m in thickness for a reproducing-head portion made of a magnetic material is formed on the insulating layer 2.

Figure 2A:
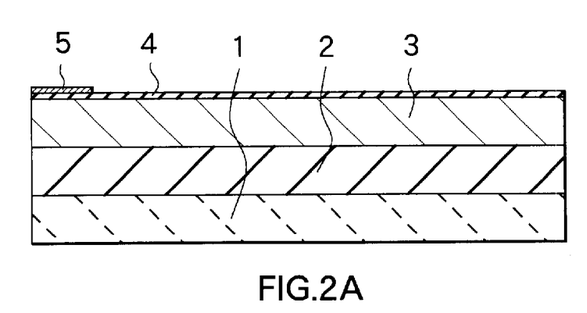
FIGS. 2A and 2B are cross-sectional views for describing the procedure following FIGS. 1A and 1B.
Figure 2B:
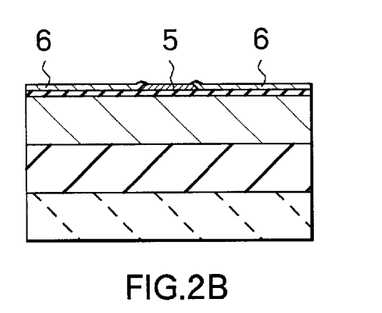

As shown in FIGS. 2A and 2B, alumina or aluminum oxide is sputtered on the bottom shield layer 3 to form a bottom shield gap layer 4 of 30–150 nm in thickness thereon as an insulating layer. An MR film of tens of nanometer in thickness for forming an MR element 5 for reproduction is formed on the bottom shield gap layer 4. Then, a photoresist pattern is formed selectively at the position where the MR element 5 should be formed on the MR film. The photoresist pattern should be a shape whose cross section is T-type, for example, so that the photoresist pattern can be lifted off easily. Next, the MR film is etched by ion-milling, for example, using the photoresist pattern as a mask to form the MR element 5. The MR element 5 may be either a GMR or an AMR element. Next, a pair of a first electrode layer 6 of tens of nanometer in thickness, which is electrically connected to the MR element 5, is formed on the bottom shield gap layer 4 using the same photoresist pattern as a mask. The first electrode layer 6 may be formed through stacking TiW, CoPt, TiW, Ta, for example. Then, the photoresist pattern is lifted off.

Figure 3A:
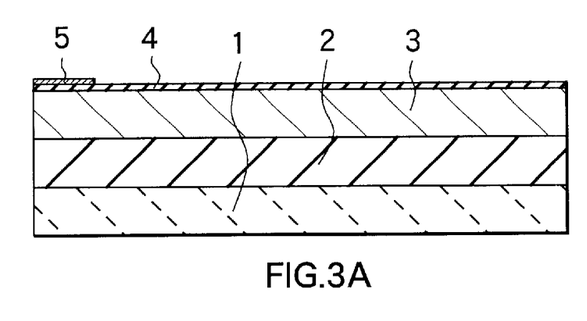
FIGS. 3A and 3B are cross-sectional views for describing the procedure following FIGS. 2A and 2B.
Figure 3B:
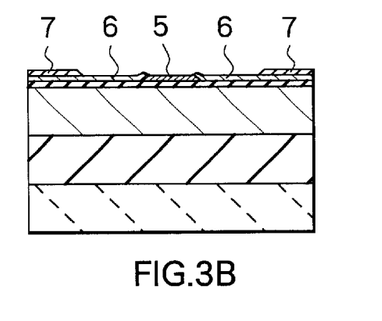

As shown in FIGS. 3A and 3B, a pair of a second electrode layer 7, which is electrically connected to the first electrode layer 6, is formed in a predetermined pattern. The thickness of the second electrode layer 7 may be 150 nm in thickness, for example. The second electrode layer 7 may be formed from copper (Cu), for example. The first electrode layer 6 and the second electrode layer 7 constitute a lead, which is electrically connected to the MR element 5.

Figure 4A:
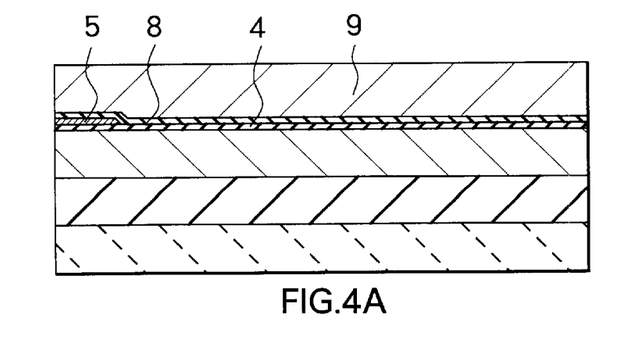
FIGS. 4A and 4B are cross-sectional views for describing the procedure following FIGS. 3A and 3B.
Figure 4B:
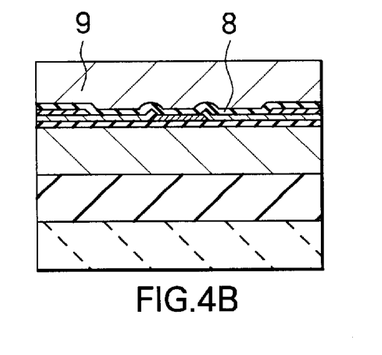

As shown in FIGS. 4A and 4B, an upper shield gap layer 8 of 30–150 nm in thickness used as an insulating layer is formed on the bottom shield gap layer 4 and the MR element 5. The MR element 5 is thus buried within the shield gap films 4 and 8. Then, an upper shield layer-cum-bottom pole layer (called bottom pole layer in the followings) 9 of about 3 nm in thickness is formed on the upper shield gap layer 8. The bottom pole layer 9 is made of a magnetic material and used both for a reproducing head and for a recording head.

Figure 5A:
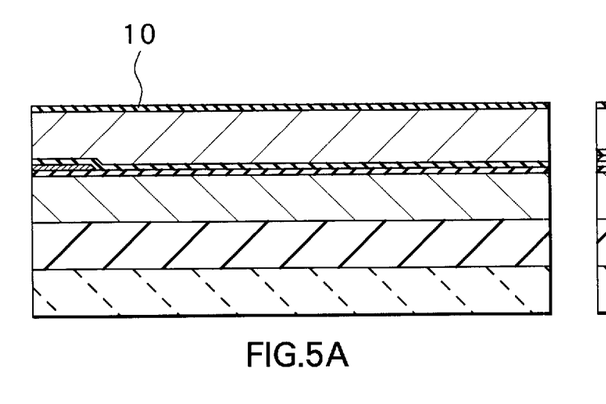
FIGS. 5A and 5B are cross-sectional views for describing the procedure following FIGS. 4A and 4B.
Figure 5B:
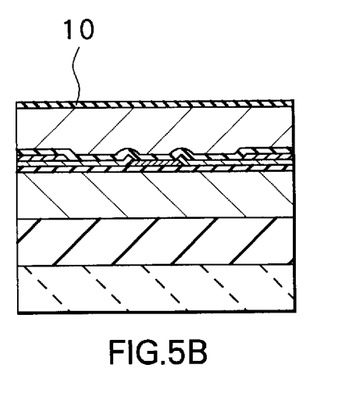

As shown in FIGS. 5A and 5B, a write gap layer 10, which is made of an insulating film such as alumina film, is formed to 0.1–0.3 $\mu$m in thickness on the bottom pole layer 9.

Figure 6A:
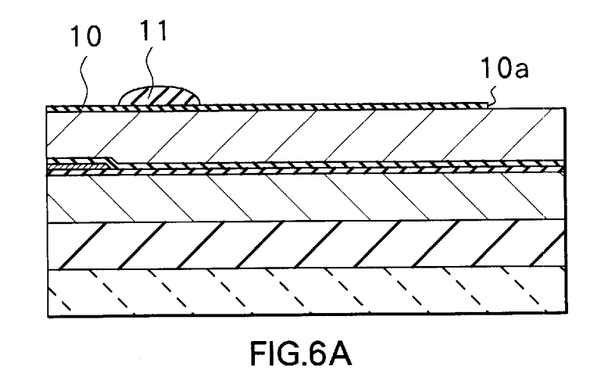
FIGS. 6A and 6B are cross-sectional views for describing the procedure following FIGS. 5A and 5B.
Figure 6B:
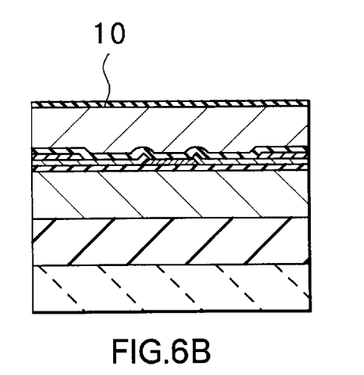

As shown in FIGS. 6A and 6B, an insulating layer 11 for determining throat height is formed on the write gap layer 10. The thickness of the insulating layer 11 may be 1.0–3.0 $\mu$m, for example. The insulating layer 11 may be formed by heating the photoresist layer, for example, or may be formed from alumina film, silicon oxide film, silicon nitride film and so on. Then, a contact hole 10a is formed by etching the write gap layer 10 partially to form a yoke in the rear (right-hand side in FIG. 6A) of the insulating layer 11.

Figure 7A:
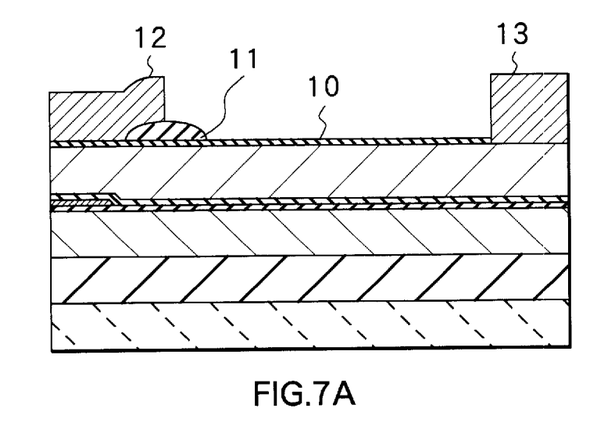
FIGS. 7A and 7B are cross-sectional views for describing the procedure following FIGS. 6A and 6B.
Figure 7B:
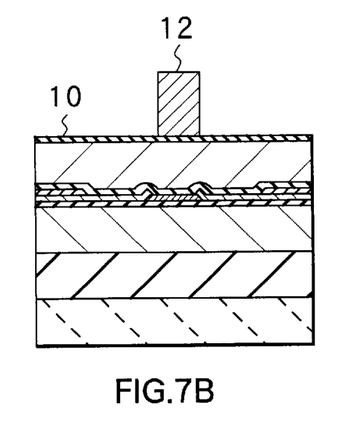

As shown in FIGS. 7A and 7B, an upper pole tip portion, pole tip 12 made of a magnetic material for the recording head is formed to spread over the air-bearing surface and the insulating layer 11 by a frame plating method, for example. The thickness of the pole tip 12 may be about 1.0–3.0 $\mu$m, for example. At the same time, a pole layer 13 of about 1.0–3.0 $\mu$m, for example, in thickness for forming the yoke is formed in the contact hole 12a by using the same material as the one used for the pole tip 12.

Figure 8A:
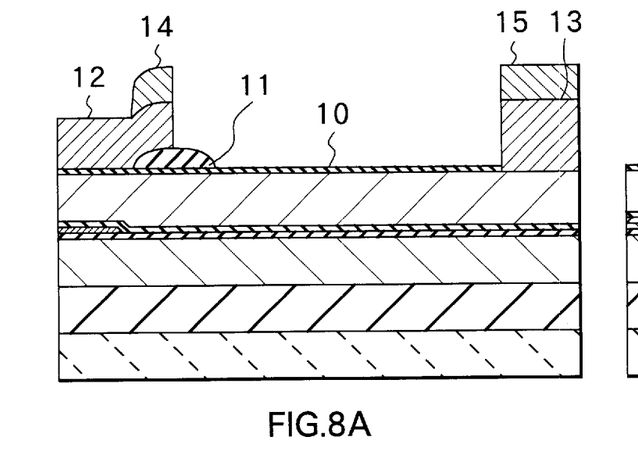
FIGS. 8A and 8B are cross-sectional views for describing the procedure following FIGS. 7A and 7B.
Figure 8B:
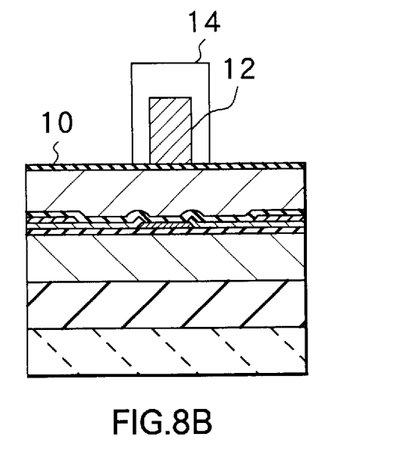

As shown in FIGS. 8A and 8B, a sub-pole tip 14 which is wider than the pole tip 12 is formed on the pole tip 12 by a frame plating method, for example. The sub-pole tip 14 is about 1–5 $\mu$m, for example, in width and about 1–3 $\mu$m, for example, in thickness. At the same time, a pole layer 15 of about 1.0–3.0 $\mu$m, for example, in thickness for forming the yoke is formed on the pole layer 13 by using the same material as the one used for the sub-pole tip 14.

Figure 9A:
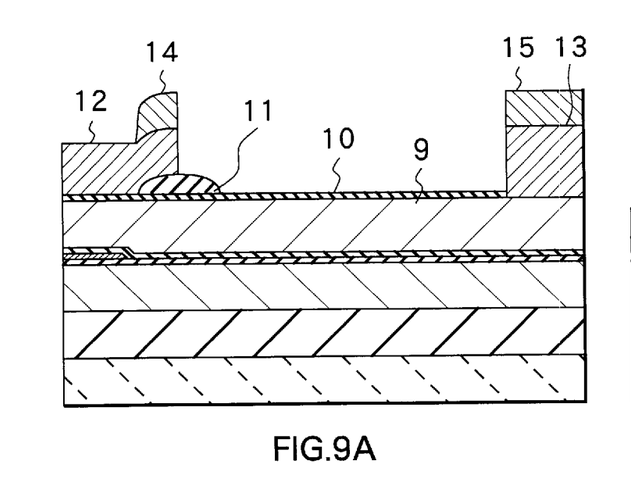
FIGS. 9A and 9B are cross-sectional views for describing the procedure following FIGS. 8A and 8B.
Figure 9B:
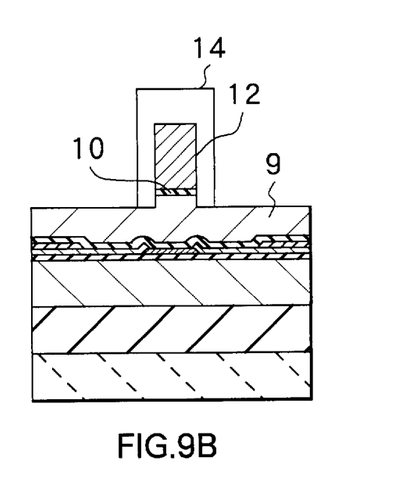

As shown in FIGS. 9A and 9B, the write gap layer 10 and, furthermore, the bottom pole layer 9 are etched by 0.3–0.5 $\mu$m, for example, by ion-milling using the sub-pole tip 14 as a mask to form a trim structure. The trim structure can prevent widening of effective write track width by suppressing widening of flux in writing data.

Figure 10A:
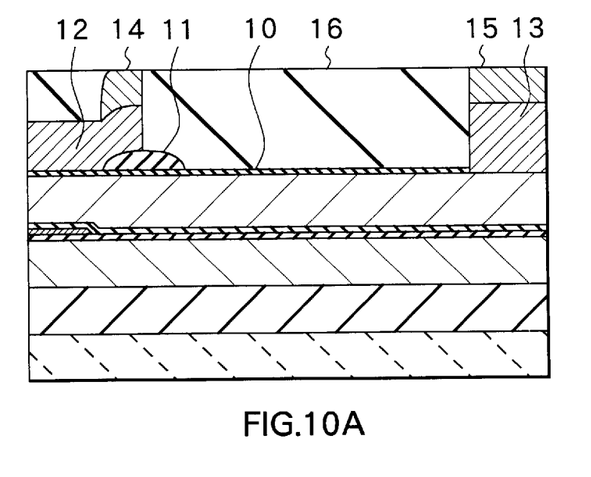
FIGS. 10A and 10B are cross-sectional views for describing the procedure following FIGS. 9A and 9B.
Figure 10B:
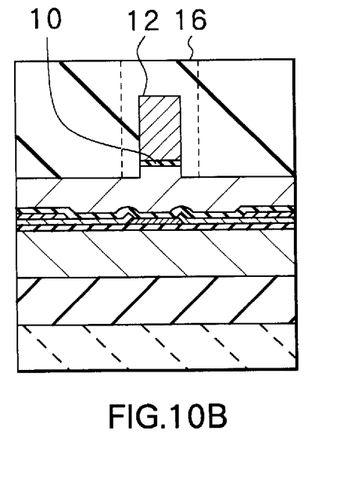

As shown in FIGS. 10A and 10B, an insulating layer 16 made of alumina, for example, of 1–6 $\mu$m, for example, in thickness is formed on the whole surface. Then, the insulating layer 16 is polished and flattened to the surface of the sub-pole tip 14 and the pole layer 15. As the polishing method for this process, mechanical polishing or CMP (chemical mechanical polishing) may be used. Flattening the insulating layer 16 exposes the surface of the sub-pole tip 14 and the pole layer 15, while creating a structure in which the space between the pole tip 12 and the sub-pole tip 14, and the pole layers 13 and 15 is filled with the insulating layer 16.

Figure 11A:
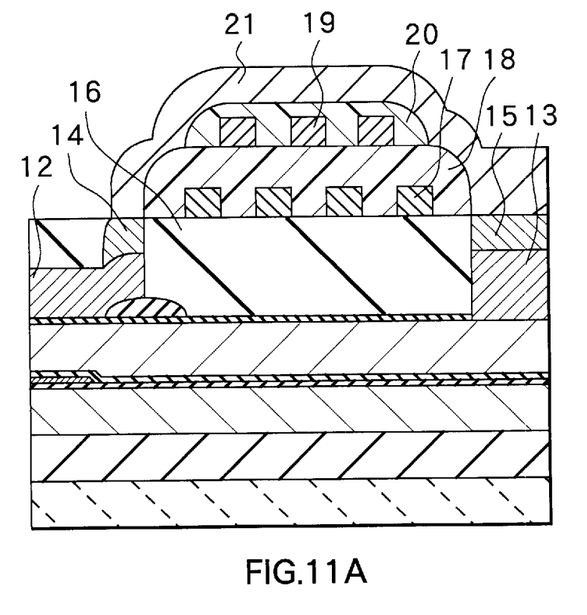
FIGS. 11A and 11B are cross-sectional views for describing the procedure following FIGS. 10A and 10B.
Figure 11B:
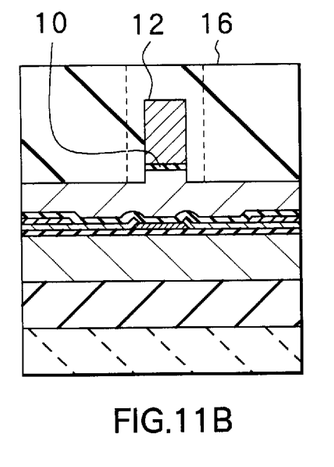

As shown in FIGS. 11A and 11B, a thin film coil 17 for an inductive recording head is formed on the insulating layer 16 by a plating method, for example. The thickness of the thin film coil 17 may be 3 $\mu$m, for example. Then, a photoresist layer 18 is formed on the insulating layer 16 and the thin film coil 17 in a predetermined pattern. A heat treatment of the temperature of 200–250° C., for example, is applied for stabilizing the photoresist layer 18. Then, a thin film coil 19 of 3 $\mu$m in thickness is formed on the photoresist layer 18. A photoresist layer is formed on the photoresist layer 18 and the thin film coil 19 in a predetermined pattern. A heat treatment of the temperature of 200–250° C., for example, is applied for stabilizing the photoresist layer.

Further, a top pole yoke 21 for a recording head, made of a magnetic material, is formed on the sub-pole tip 14, the insulating layer 16, the photoresist layers 18 and 20 in thickness of about 2–3 $\mu$m, for example. The top pole yoke 21 has a contact with and is magnetically coupled to the bottom pole layer 9 through the pole layers 13 and 15 formed in the contact hole 12a in the rear of the thin film coils 17 and 19.

Figure 12A:
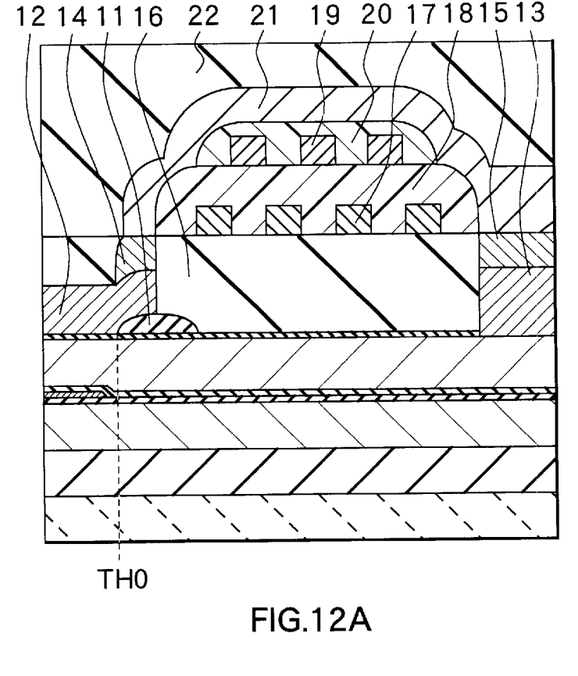
FIGS. 12A and 12B are cross-sectional views for describing the procedure following FIGS. 11A and 11B.
Figure 12B:
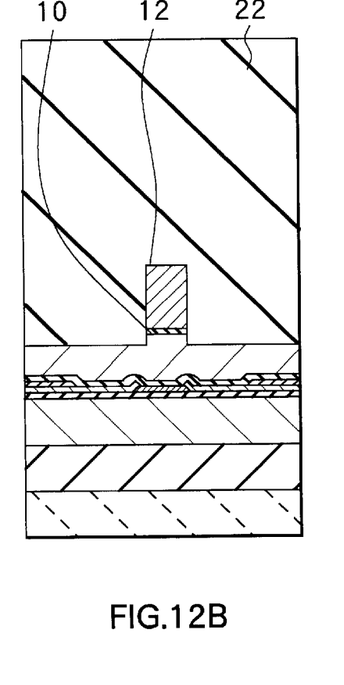

Further, as shown in FIGS. 12A and 12B, the over coat layer 22 made of alumina, for example, is formed on the top pole yoke 21 in thickness of 30–40 $\mu$m, for example. At last, a thin film magnetic head according to this embodiment is completed through forming an air-bearing surface of a recording head and a reproducing head by a slider machine processing.

In this embodiment, each of the bottom pole layer 9, the pole tip 12, the sub-pole tip 14 and the top pole yoke 21 is formed with NiFe (Ni: 80 weight percentage, Fe: 20 weight percentage). However, they may be formed with NiFe (Ni: 50 weight percentage, Fe: 50 weight percentage) or high saturation flux density materials such as Sendust, nitride ferrous (FeN) or its compound, amorphous of FeCoZr. A structure of stacking more than two kinds of the materials may be also possible.

In this embodiment, the throat height is determined by the insulating layer 11, and the throat height 0 position, TH0, is at the edge of the insulating layer 11 on the air-bearing surface side thereof, as shown in FIG. 12.

Figure 13:
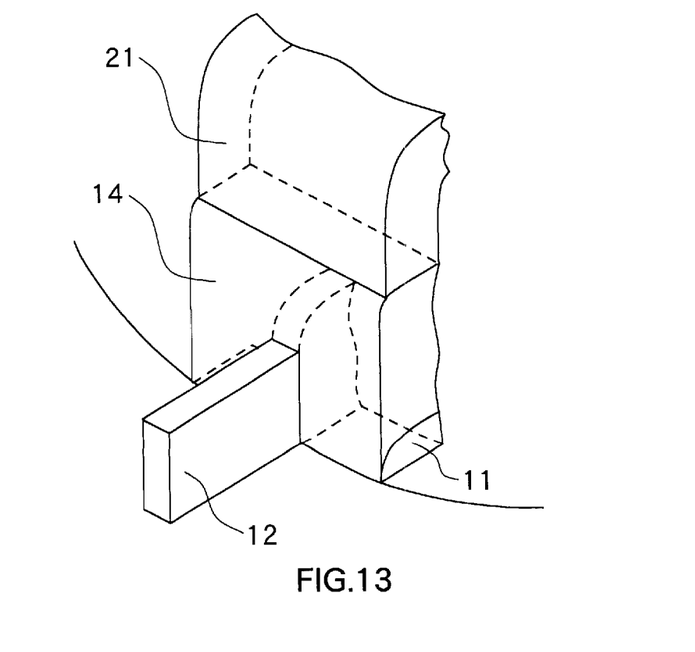
FIG. 13 is a perspective view showing a structure of a top pole layer of a thin film magnetic head according to the first embodiment of the invention in vicinity of the air-bearing surface thereof.
Figure 14:
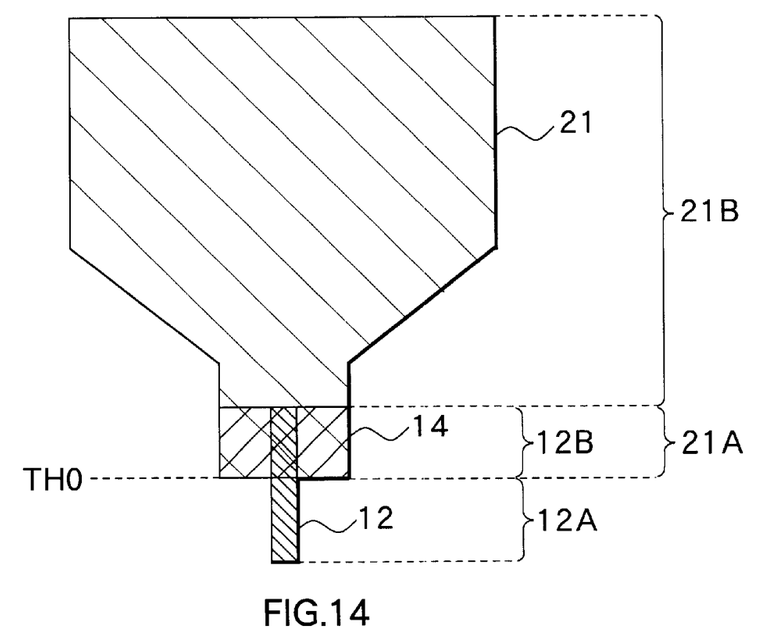
FIG. 14 is a plan view for describing the relationship of the positions of a magnetic pole portion, a sub-magnetic pole portion and a yoke area of a thin film magnetic head according to the first embodiment of the invention.

FIG. 13 is a perspective view for showing a structure of a top pole layer of a thin film magnetic head according to this embodiment manufactured as described above in vicinity of the air-bearing surface (the surface facing the medium) thereof. FIG. 14 shows a plan view of the top pole layer.

In the embodiment, the pole tip 12, the sub-pole tip 14 and the top pole yoke 21 constitute the top pole layer, which corresponds to one of the two magnetic layers of this invention. The part 12A of the pole tip 12, which is not covered by the sub-pole tip 14, corresponds to the magnetic pole portion according to the present invention. The part 12B where the pole tip 12 and the sub-pole tip 14 are overlapped corresponds to the sub-magnetic pole portion according to the present invention. The top pole yoke 21 corresponds to the yoke area according to the present invention. The width of the top pole yoke 21 is equal to the width of the sub-magnetic pole portion 12B, for example, in this. embodiment. The top pole yoke 21 comprises the connecting portion 21A which is magnetically coupled to the sub-pole tip 14 and the yoke area 21B which is formed to be wider than the connecting portion 21A.

In the embodiment, the top pole layer is divided into the pole portion including the pole tip 12 and the sub-pole tip 14 and the yoke area constituted by the top pole yoke 21. As a result, the pole tip 12 can be formed on an almost flat surface without any apex area. Accordingly, the pole tip 12 can be micronized down to the order of half-micron or quarter-micron.

Further, in the embodiment, the sub-pole tip 14 is magnetically coupled to one edge of the pole tip 12, which faces the air-bearing surface at the other edge. The top pole yoke 21 is magnetically coupled to the sub-pole tip 14.

The magnetic pole portion 12A comprises the pole tip 12, which is narrow. On the other hand, the sub-magnetic pole portion 12B has a layered structure by stacking the pole tip 12 and the sub-pole tip 14. Moreover, the connecting portion 21A of the top pole yoke 21 is overlapped on the layered structure. In other words, the magnetic layer of the sub-magnetic pole portion 12B is bigger than that of the magnetic pole portion 12A in width and thickness, that is, in volume.

Further, in the embodiment, the edge of the sub-magnetic pole portion 12B to the air-bearing surface thereof is placed in vicinity of the edge of the insulating layer 11 closer to the air-bearing surface thereof, that is, at the throat height 0 position, TH0. The vicinity of the throat height 0 position, TH0, as used herein refers to the range of plus or minus 0.5 $\mu$m of the throat height 0 position, TH0. The position of the edge closer to the air-bearing surface of the connecting portion 21A of the top pole yoke 21 may not be exactly the same as the position of the edge closer to the air-bearing surface of the sub-pole tip 14.

In the embodiment, the magnetic pole portion 12A which is a rectangular parallelepiped is perpendicular both to the air-bearing surface and to the edge surface closer to the air-bearing surface of the sub-magnetic pole portion 12B. In other words, the magnetic pole portion 12A and the sub-magnetic pole portion 12B form a complete convex shape with their plain surfaces. The convex shape can be obtained by patterning a magnetic layer to the convex shape at a time by photolithography. However, when the pole portion is micronized to the order of submicron, the photoresist causes a considerable deformation of the pattern in its corners. Accordingly, it is difficult to keep a sharp and accurate convex shape.

On the other hand, in the embodiment, first, the pole tip 12 is formed in a micro rectangular parallelepiped and then the sub-pole tip 14 is placed on the edge opposite to the air-bearing surface of the pole tip 12, thereby the sub-magnetic pole portion 12B is formed. Accordingly, it is possible to form the sub-magnetic pole portion 12B into a sharp and accurate shape without the deformation of the pattern as described above.

Figure 15:
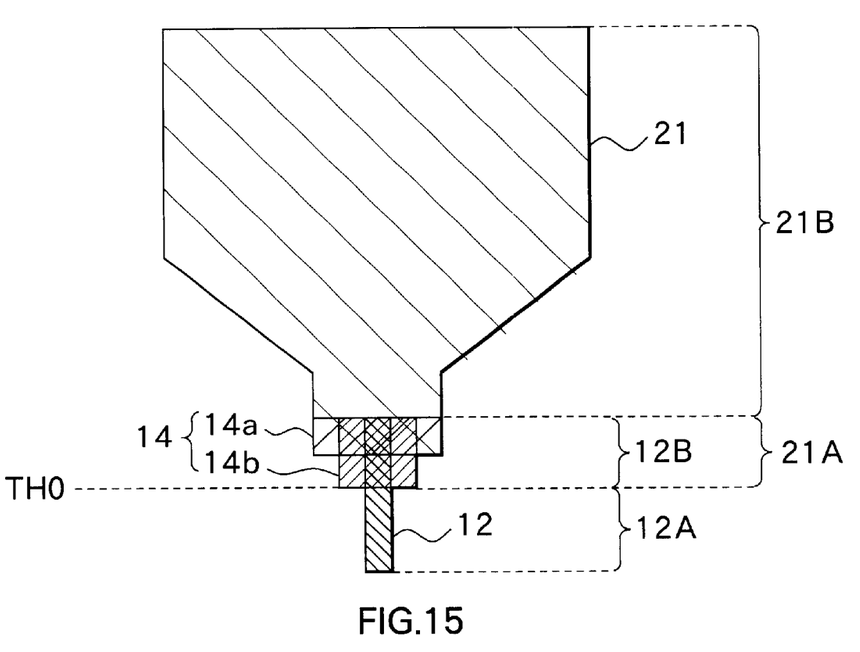
FIG. 15 is a plan view for describing a modified example according to a first embodiment of the invention.

In the embodiment, the width of the pole portion is reduced in two levels: at the magnetic pole portion 12A and at the sub-magnetic pole portion 12B. However, the width or thickness of the sub-magnetic pole portion may be reduced in two or more levels by applying the method described above repeatedly so as to reduce the width or thickness of the whole pole portion in multiple levels. FIG. 15 shows an example of the sub-magnetic pole portion that is divided into the sub-magnetic pole portions 14a and 14b.

In the embodiment, the sub-magnetic pole portion 12B with the sub-pole tip 14 is wider and thicker compared to the pole tip 12 of the magnetic pole portion 12A. According to the embodiment, the volume of the magnetic layer in vicinity of the throat height 0 position, TH0, can be bigger than the volume of the sub-magnetic pole portion without the sub-pole tip 14. Also, it is possible to prevent flux saturation in vicinity of the throat height 0 position, TH0.

As described above, according to the embodiment, the volume of the sub-magnetic pole portion 12B is bigger than that of the magnetic pole portion 12A. Therefore, it is possible to obtain the sufficient over write characteristic even if the pole width is reduced to the order of half-micron or quarter-micron, for example. Particularly, at least the magnetic pole portion 12A is formed with a high saturation flux density material. The flux thus does not saturate on the way, but effectively reach the magnetic pole portion 12A. As a result, an efficient recording head can be achieved.

Second Embodiment

Next, the second embodiment of the invention will be described with reference to FIGS. 16A and 16B to 20A and 20B. FIGS. 16A, 17A, 18A, 19A and 20A show cross-sectional views vertical to an air-bearing surface. FIGS. 16B, 17B, 18B, 19B and 20B show cross-sectional views parallel to the air-bearing surface of a magnetic pole portion.

Figure 16A:
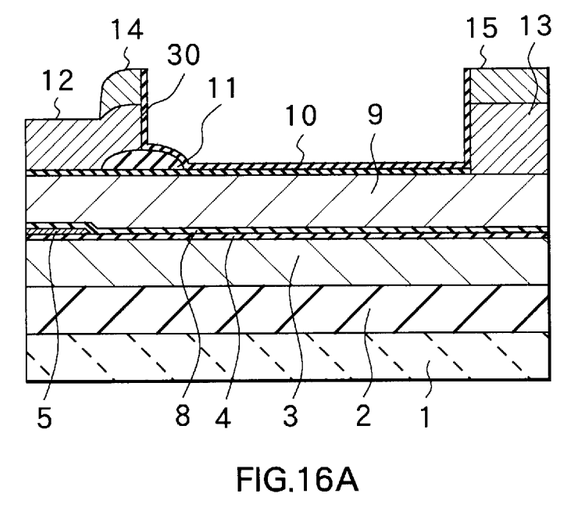
FIGS. 16A and 16B are cross-sectional views for describing one step of a manufacturing procedure of a thin film magnetic head according to a second embodiment of the invention.
Figure 16B:
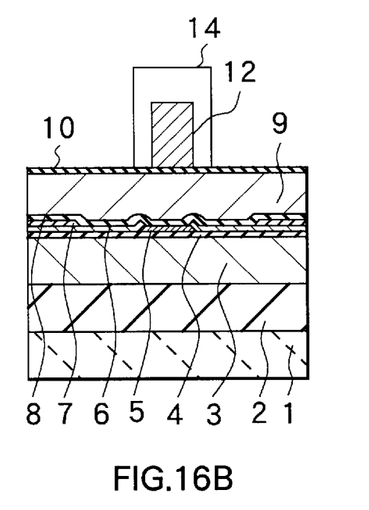

In the manufacturing method of a thin film magnetic head according to this embodiment, the thin film magnetic head is manufactured in the same steps as in the first embodiment until the sub-pole tip 14 and the pole layer 15 are formed. Then, in this embodiment, an insulating layer 30 made of alumina, for example, is formed in the region between the pole tip 12 and the sub-pole tip 14, and the pole layers 13 and 15, where a thin film coil should be formed. The thickness of the insulating layer 30 may be 0.1–0.5 $\mu$m, for example. However, the insulating layer 30 is dispensable.

Figure 17A:
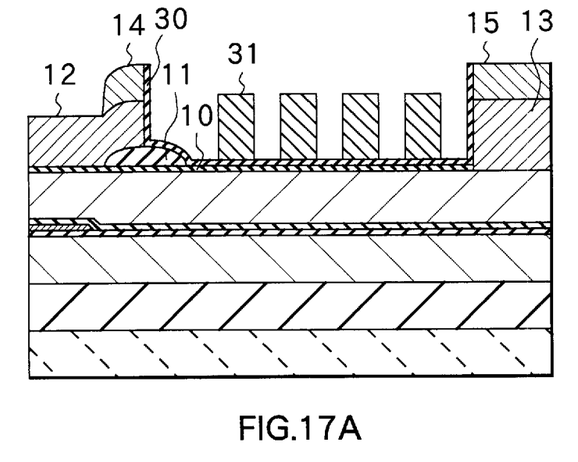
FIGS. 17A and 17B are cross-sectional views for describing the procedure following FIGS. 16A and 16B.
Figure 17B:
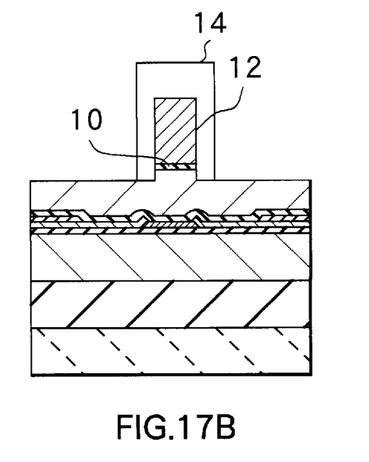

Next, as shown in FIGS. 17A and 17B, a thin film coil 31 for an inductive recording head is formed on the insulating layer 30 by plating, for example.

Figure 18A:
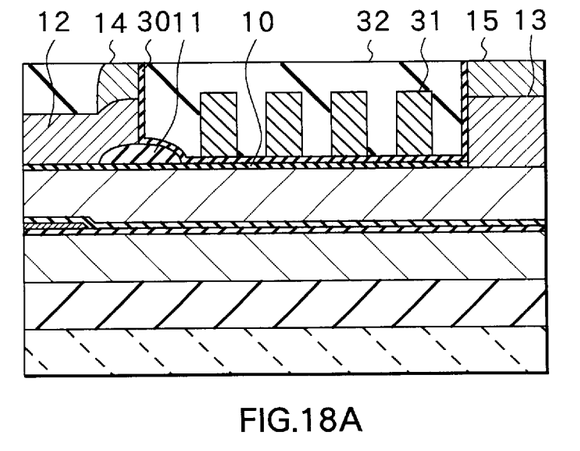
FIGS. 18A and 18B are cross-sectional views for describing the procedure following FIGS. 17A and 17B.
Figure 18B:
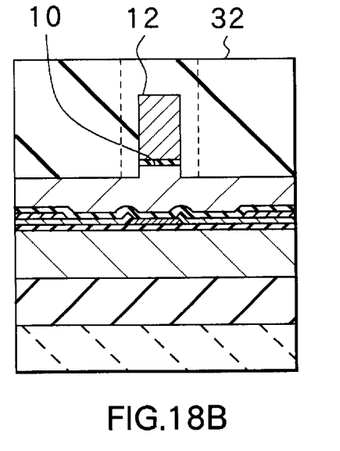

Then, as shown in FIGS. 18A and 18B, an insulating layer 32 made of alumina, for example, is formed on all over the surface of the insulating layer 30 and the thin film coil 31. The thickness of the insulating layer 32 may be 1–6 $\mu$m, for example. The insulating layer 32 is ground and flattened to the surface of the sub-pole tip 14 and the pole layer 15 by CMP, for example. Flattening the insulating layer 32 leads to the exposure of the surface of the sub-pole tip 14 and the pole layer 15. Also, the thin film coil 31 between the pole tip 12 and the sub-pole tip 14, and the pole layers 13 and 15 is buried in the insulating layer 32.

Figure 19A:
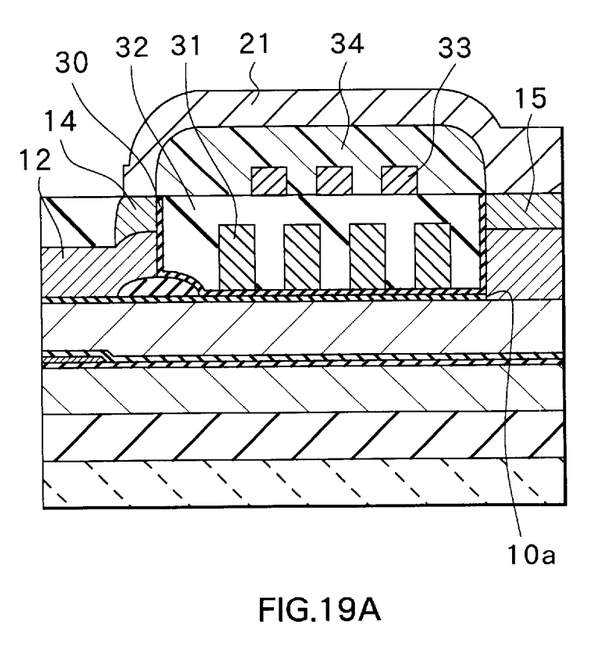
FIGS. 19A and 19B are cross-sectional views for describing the procedure following FIGS. 18A and 18B.
Figure 19B:
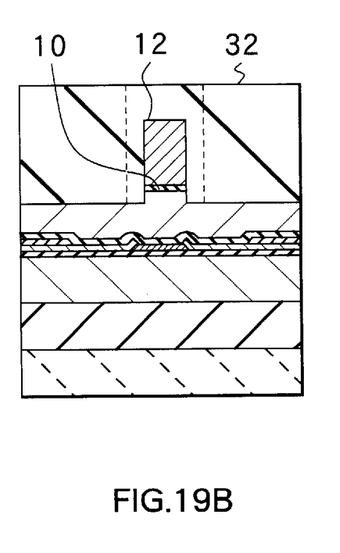

As shown in FIGS. 19A and 19B, a thin film coil 33 is formed on the insulating layer 32 by plating, for example. Then, the photoresist layer 34 is formed on the insulating layer 32 and the thin film coil 33 in a predetermined pattern. A heat treatment of the temperature of 200–250° C., for example, is applied for stabilizing the photoresist layer 34.

Further, the top pole yoke 21 for the recording head made of a magnetic material, for example, is formed on the sub-pole tip 14, the insulating layer 32, the photoresist layer 34 and the pole layer 15. The thickness of the top pole yoke 21 may be about 2–3 $\mu$m, for example. The top pole yoke 21 has a contact with and is magnetically coupled to the bottom pole layer 9 through the pole layers 13 and 15 which are formed on the contact hole 10a in the rear of the thin film coils 31 and 33.

Figure 20A:
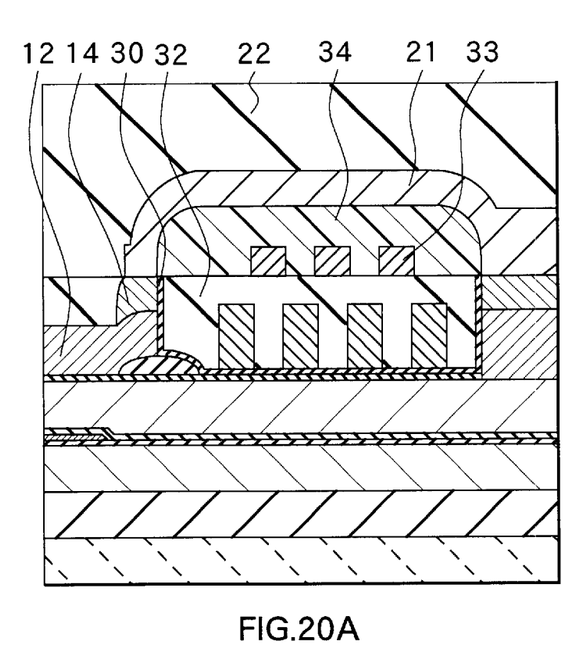
FIGS. 20A and 20B are cross-sectional views for describing the procedure following FIGS. 19A and 19B.
Figure 20B:
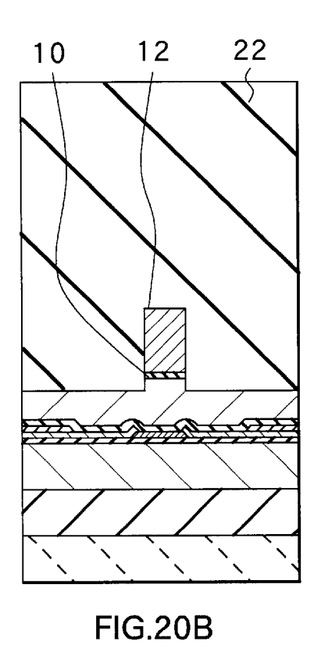

Next, as shown in FIGS. 20A and 20B, an over coat layer 22, made of alumina, for example, is formed on the top pole yoke 21. The thickness of the over coat layer 22 may be 30–40 $\mu$m, for example. At last, an air-bearing surface of the recording head and a reproducing head is formed through a slider machine processing, and thus the thin film magnetic head according to this embodiment is completed.

In the embodiment, the thin film coil 31 is buried in the insulating layer 32 between the pole tip 12 and the sub-pole tip 14, and the pole layers 13 and 15. The top pole yoke 21 thus has a smaller difference in height than that of the first embodiment, and the top pole yoke 21 is micronized to the order of half-micron or quarter-micron.

In this embodiment, when the thin film coil 31 is buried, the thin film coil 31 just needs to be buried into the lower part than the surface of the sub-pole tip 14. Therefore, the film thickness of the pole tip 12 is not limited by the film thickness of the thin film coil 31. As a result, the pole tip 12 can be more micronized.

According to this embodiment, the thick insulating layer 30 is formed between the thin film coil 31 and the bottom pole layer 9 in addition to the thin write gap layer 10. Therefore, the insulating pressure resistance between the thin film coil 31 and the bottom pole layer 9 is increased, and a leak of the magnetic flux from the thin film coil 31 is reduced.

Other structures, operations and effects in this embodiment are identical to those of the first embodiment.

The invention also includes other various modifications, not limiting to the embodiments. In the embodiment, the insulating layer 11 for determining a throat height is formed on the write gap layer 10, and then the pole tip 12 and the sub-pole tip 14 are formed on the insulating layer 11. However, the pole tip 12 and the sub-pole tip 14 may be formed on the write gap layer 10 without forming the insulating layer 11. In this case, the throat height is determined by the edge opposite to the air-bearing surface of the pole tip 12.

Each of the embodiments describes the thin film magnetic head having the structure in which the MR element for reading is formed closer to the substrate and then the inductive-type transducer element for writing is stacked on the MR element. However, the order of stacking may be reversed; the inductive-type transducer element for writing is formed closer to the substrate, and then the MR element for reading is stacked on the inductive-type transducer element. This structure is achieved as follows. A magnetic film with a function as the top pole layer described in the embodiments is formed on the substrate, and then another magnetic film with a function as the bottom pole layer described in the embodiments is formed faced therewith with a write gap film in between. Preferably, the top pole layer of the inductive-type transducer element also functions as the bottom shield layer of the MR element.

Furthermore, in a different embodiment, all of the insulating layers formed between each two thin film coils constituting the coil area of the inductive-type transducer element may be inorganic insulating layers.

The present invention can be also applied to a thin film magnetic head, which has only an inductive-type transducer element and performs writing with the inductive-type transducer element.

As described, according to the thin film magnetic head, or the manufacturing method of the thin film magnetic head of the invention, the sub-magnetic pole portion with greater film thickness and volume than the magnetic pole portion is provided adjacent to the pole portion. Thus, precise control of the pole width can be achieved and sufficient over write characteristic can be obtained even if the pole width of the pole portion is reduced.

Particularly, according to the thin film head or the manufacturing method of a thin film magnetic head of one aspect of the invention, a magnetic layer with a rectangular section is formed as an magnetic pole portion, and then a part of the magnetic layer opposite to the surface facing the medium is covered with at least another magnetic layer, thereby the covered area is used as the sub-magnetic pole portion. Thus, the pole portion and the sub-magnetic pole portion can be formed with high precision.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head comprising two magnetic layers, each of the two magnetic layers having a magnetic pole, each of the magnetic poles facing each other with a write gap layer in between, the write gap layer disposed near and in a recording-medium-facing surface that faces a recording medium, a thin film coil provided between the two magnetic layers, and an insulating layer that insulates the thin film coil from the two magnetic layers, wherein at least one of the two magnetic layers comprises:
a first magnetic pole portion having a first end portion which is positioned adjacent to the recording medium and a second end portion that is positioned distal from the recording medium;
a sub-magnetic pole portion, including the second end portion of the first magnetic pole portion and a sub-pole tip magnetically coupled to the second end portion of the first magnetic pole portion, the sub-magnetic pole portion having a greater maximum film thickness than a maximum film thickness of the first magnetic pole portion; and
a yoke that is magnetically coupled to the sub-magnetic pole portion, the yoke including a connecting portion and a yoke area, the connecting portion being in contact with the sub-magnetic pole portion and having a width in a direction orthogonal to the film thickness of the sub-magnetic pole portion and parallel to the recording-medium-facing surface, the width of the connecting portion being equal to a width of the sub-magnetic pole portion where the sub-magnetic pole portion is in contact with the connecting portion in the direction.

2. A thin film magnetic head according to claim 1, wherein the sub-magnetic pole portion is wider than the first magnetic pole portion in the direction orthogonal to the film thickness of the sub-magnetic pole portion.

3. A thin film magnetic head according to claim 1, wherein the first end portion of the first magnetic pole portion is a rectangular parallelepiped having sidewalls, the sidewalls being perpendicular to both the recording medium and to a surface of the sub-pole tip closest to the recording medium.

4. A thin film magnetic head according to claim 1, wherein the film thickness of the sub-magnetic pole portion is reduced gradually as it approaches the recording medium.

5. A thin film magnetic head according to claim 4, wherein the width of the sub-magnetic pole portion in the direction orthogonal to the film thickness of the sub-magnetic pole portion is reduced gradually as it approaches the recording medium.

6. A thin film magnetic head according to claim 1, further comprising a second insulating layer provided between the write gap layer and the sub-magnetic pole portion for determining a throat height.

7. A thin film magnetic head according to claim 6, wherein an edge of the sub-magnetic pole portion closest to the recording medium is placed in vicinity of an edge of the second insulating layer closest to the recording medium.

8. A thin film magnetic head according to claim 1, wherein the yoke area is wider than the sub-magmagnetic pole portion in the direction orthogonal to the film thickness of the sub-magnetic pole portion.

9. A thin film magnetic head according to claim 1, wherein at least one layer of thin film coil is formed in a region which lies along a surface opposite to a surface of the sub-magnetic pole portion facing the recording medium, and a surface of the write gap layer.

10. A manufacturing method of a thin film magnetic head comprising two magnetic layers, each of the two magnetic layers having a magnetic pole, each of the magnetic poles facing each other with a write gap layer in between, the write gap layer disposed near and in a recording-medium-facing surface that faces a recording medium, a thin film coil provided between the two magnetic layers, and an insulating layer that insulates the thin film coil from the two magnetic layers, comprising the steps of:

forming a first magnetic pole portion so that a first end portion of the first magnetic pole portion is positioned adjacent to the recording medium and a second end portion is positioned distal from the recording medium;

forming a sub-magnetic pole portion, including the second end portion of the first magnetic pole portion and a sub-pole tip magnetically coupled to the second end portion of the first magnetic pole portion, the sub-magnetic pole portion having a greater maximum film thickness than a maximum film thickness of the first magnetic pole portion; and forming a yoke that is magnetically coupled to the sub-magnetic pole portion, the yoke including a connecting portion and a yoke area, the connecting portion being in contact with the sub-magnetic pole portion and having a width in a direction orthogonal to the film thickness of the sub-magnetic pole portion and parallel to the recording-medium-facing surface, the width of the connecting portion being equal to a width of the sub-magnetic pole portion where the sub-magnetic pole portion is in contact with the connecting portion in the direction.

11. A manufacturing method of a thin film magnetic head according to claim 10, wherein the sub-magnetic pole portion is formed wider than the first magnetic pole portion in the direction orthogonal to the film thickness of the sub-magnetic pole portion.

12. A manufacturing method of a thin film magnetic head according to claim 10, wherein the first end portion of the first magnetic pole portion is a rectangular parallelpiped having sidewalls, the sidewalls being perpendicular to the recording medium and to a surface of the sub-pole tip closest to the recording medium.

13. A manufacturing method of a thin film magnetic head according to claim 12 wherein the film thickness of the sub-magnetic pole portion is reduced gradually as it approaches the recording medium.

14. A manufacturing method of a thin film magnetic head according to claim 10, wherein the width of the sub-magnetic pole portion in the direction orthogonal to the film thickness of the sub-magnetic pole portion is reduced gradually as it approaches the recording medium.

15. A manufacturing method of a thin film magnetic head according to claim 10, wherein the first end portion of the first magnetic pole portion is a rectangular parallelepiped, and then the sub-magnetic pole portion is formed in a manner that the second end portion of the first magnetic pole portion is covered with the sub-pole tip.

16. A manufacturing method of a thin film magnetic head according to claim 10, wherein the write gap layer is formed and then a second insulating layer for determining a throat height is formed between the write gap layer and the sub-magnetic pole portion.

17. A manufacturing method of a thin film magnetic head according to claim 16, wherein an edge of the sub-magnetic pole portion closest to the recording medium is placed in vicinity of an edge of the second insulating layer closest to the recording medium.

18. A manufacturing method of a thin film magnetic head according to claim 10, wherein the yoke area is formed wider than the sub-magnetic pole portion in the direction orthogonal to the film thickness of the sub-magnetic pole portion.

19. A manufacturing method of a thin film magnetic head according to claim 11, wherein at least one layer of thin film coil is formed in a region which lies along a surface opposite to a surface of the sub-magnetic pole portion facing the recording medium, and a surface of the write gap layer.

* * * * *